United States Patent [19]
Oishi

[11] Patent Number: 5,861,637
[45] Date of Patent: Jan. 19, 1999

[54] SURFACE-MOUNTED MODULE WHICH PERMITS THE LIGHT OUTPUT OF AN OPTICAL SEMICONDUCTOR DEVICE MOUNTED THEREON TO BE INCREASED, AND A METHOD OF PRODUCING THE SURFACE-MOUNTED MODULE

[75] Inventor: Isamu Oishi, Kanagawa, Japan

[73] Assignee: The Furukawa Electric Co., Ltd., Tokyo, Japan

[21] Appl. No.: 836,008

[22] PCT Filed: Sep. 25, 1996

[86] PCT No.: PCT/JP96/02768

§ 371 Date: May 6, 1997

§ 102(e) Date: May 6, 1997

[87] PCT Pub. No.: WO97/12270

PCT Pub. Date: Apr. 3, 1997

[30] Foreign Application Priority Data

Sep. 27, 1995 [JP] Japan ..................................... 7-249643

[51] Int. Cl.[6] ................................................. H01L 33/00
[52] U.S. Cl. .............................. 257/98; 257/99; 257/432; 257/433; 385/92
[58] Field of Search ................................ 257/98, 99, 432, 257/433; 385/88, 92; 372/50

[56] References Cited

U.S. PATENT DOCUMENTS

| | | | |
|---|---|---|---|
| 5,321,786 | 6/1994 | Valette et al. | 385/92 |
| 5,412,748 | 5/1995 | Furuyama et al. | 257/98 |
| 5,526,454 | 6/1996 | Mayer | 385/49 |

FOREIGN PATENT DOCUMENTS

| | | |
|---|---|---|
| 55-100514 | 7/1980 | Japan . |
| 63-155110 | 6/1988 | Japan . |
| 3-114007 | 5/1991 | Japan . |
| 6-160676 | 6/1994 | Japan . |
| 6-174979 | 6/1994 | Japan . |
| 7-174941 | 7/1995 | Japan . |

*Primary Examiner*—Minh Loan Tran
*Attorney, Agent, or Firm*—Frishauf, Holtz, Goodman, Langer & Chick

[57] ABSTRACT

A surface-mounted module (1) having an optical semiconductor device (5) and an optical fiber (6) mounted on a substrate (2) and a method of producing the surface mounted-module. The substrate (2) of the surface-mounted module (1) comprises a base component (3), which has marks (3b) indicative of the mounting position for an optical semiconductor device and a positioning section (3c) for positioning an optical fiber and is formed by a precision transfer process, and a molded body (4) joined integrally to the base component.

15 Claims, 3 Drawing Sheets

SURFACE-MOUNTED MODULE WHICH PERMITS THE LIGHT OUTPUT OF AN OPTICAL SEMICONDUCTOR DEVICE MOUNTED THEREON TO BE INCREASED, AND A METHOD OF PRODUCING THE SURFACE-MOUNTED MODULE

TECHNICAL FIELD

The present invention relates to a surface-mounted module and a method of producing the same.

BACKGROUND ART

In the field of optical fiber communication systems, a bidirectional communication system permitting the transmission of optical signals also from the subscriber (home) side is under study. In order to construct such an optical fiber communication system, a surface-mounted module connecting a light receiving/emitting device and an optical fiber is required, and conventionally a light receiving/emitting device and an optical fiber are coupled in the manner described below, for example.

In the case of coupling a laser diode (hereinafter referred to as "LD") to an optical fiber, a mark used for mounting the LD with high accuracy is formed on a silicon substrate, and a V-groove for positioning an optical fiber is also formed in the silicon substrate such that the position thereof relative to the mark is on the submicron order. The LD and the optical fiber are coupled to each other on the substrate.

In this case, a silicon substrate is used for the following reasons. First, a silicon substrate and an optical fiber have an identical coefficient of thermal expansion, and thus the two are scarcely displaced from each other due to temperature changes. Secondly, the mark used for mounting an LD and the V-groove for positioning an optical fiber can be formed on a silicon substrate with high accuracy by lithography, anisotropic etching or the like. Thirdly, a silicon substrate transmits near infrared radiation therethrough, so that the mounting positions of the LD and optical fiber can be observed from the underside of the substrate.

There is also conventionally known a method in which a lensed fiber having a convexly curved end face obtained by fusing an end portion thereof is coupled to an LD. In the case of using a lensed fiber, however, it is necessary that the space between the LD and the lensed fiber should be set to 5 to 10 $\mu$m and also that the allowable positioning error of the LD in a transverse direction perpendicular to the optical axis of the lensed fiber should be 1 $\mu$m or less.

Meanwhile, where a silicon substrate is treated with high precision by lithography, an expensive machine is required and also the substrate must be handled with care during the treatment. On the other hand, where anisotropic etching is used for the treatment, the orientation of the silicon substrate must be set with high accuracy relative to the positioning of an etching mask, and also the etching conditions must be controlled with precision.

Therefore, in either of the above two methods, if the treatment conditions are improperly set, then the aforementioned marks and V-grooves of treated silicon substrates are subject to positional variations, lowering the yield. As a consequence, a problem arises in that the products (surface-mounted modules) are costly.

Silicon substrates may alternatively be subjected to mechanical machining; in this case, however, the productivity is low and the machining cost is high, with the result that the produced surface-mounted modules are too expensive to be put to home use.

Meanwhile, an LD unavoidably generates heat since a high current is passed therethrough per unit area. The silicon substrate, however, is poor in heat conductivity as compared with metal and thus has low heat dissipation property. Accordingly, with a surface-mounted module using a silicon substrate, the light output of the LD becomes saturated at a low current value, giving rise to a problem that the light output cannot be increased.

Further, in a conventional surface-mounted module using a lensed fiber, if a material having a large coefficient of thermal expansion is used for the substrate, the LD and the lensed fiber can come into contact with each other due to temperature changes, possibly damaging these elements. Since the aforementioned allowable positioning error is 1 $\mu$m or less, moreover, displacement in the transverse direction occurring when the LD and the lensed fiber are coupled results in variations in the coupling efficiency, causing a reduction in the yield of assembled surface-mounted modules as well as an increase of the manufacturing cost.

DISCLOSURE OF THE INVENTION

An object of the present invention is to provide a surface-mounted module which permits the light output of an optical semiconductor device mounted thereon to be increased, and a method of producing such a surface-mounted module with high precision and at low cost.

To achieve the above object, the present invention provides a surface-mounted module having an optical semiconductor device and an optical fiber mounted on a substrate, the substrate comprising a base component, which has contours corresponding to a mark indicative of a mounting position for the optical semiconductor device and a positioning section for positioning the optical fiber and is formed by a precision transfer process, and a molded body joined integrally to the base component.

Preferably, the positioning section is a V-groove.

Also, the molded body is preferably made of any of heat conductive materials including metal filler-containing resins and injection-molded metal members.

Further preferably, the optical fiber used has a lensed fiber section attached to one end thereof, and this lensed fiber section includes no core, has an isotropic refractive index and has one end face convexly curved.

Preferably, the optical semiconductor device and the optical fiber are arranged on opposite sides of a transverse groove so as to face each other.

To achieve the above object, the present invention also provides a method of producing the surface-mounted module, which method comprises: forming a transfer body by a precision transfer process using a master component which has surface unevenness formed so as to be converse to that of a substrate having a mark indicative of a mounting position for an optical semiconductor device and a positioning section for positioning an optical fiber; backing the transfer body with a heat conductive material; and positioning an optical semiconductor device and an optical fiber by means of the mark and the positioning section, respectively, to thereby mount the optical semiconductor device and the optical fiber.

The "precision transfer process" referred to in the present specification denotes a process of forming a transfer body by duplicating the surface unevenness of the master component at a molecular level of submicron order, and includes, for example, electroforming, sputtering, etc.

By using the precision transfer process, the mark indicative of the mounting position for an optical semiconductor device and the positioning section for positioning an optical fiber can be accurately duplicated from the master component onto the base component, whereby surface-mounted modules having an optical semiconductor device and an optical fiber mounted thereon can be manufactured with high precision and at low cost. Further, where the molded body used is made of a heat conductive material and joined integrally to the base component, the heat dissipation property can be enhanced, compared with a conventional surface-mounted module using a silicon substrate which has poor heat dissipation property, and the light output of the mounted optical semiconductor device, for example, a semiconductor laser, can be increased.

An optical fiber used in this case may be such that a lensed fiber section, which includes no core and has an isotropic refractive index and an end face of which is convexly curved, is attached to one end of the optical fiber. In this case, the coupling efficiency is not affected much if the distance between the optical fiber and the optical semiconductor device is set to 100 $\mu$m or more, or if the allowable positioning error of the optical axis of the optical fiber in the transverse direction perpendicular to the optical axis of the optical semiconductor device is 1 $\mu$m or more.

BEST MODE OF CARRYING OUT THE INVENTION

An embodiment of the present invention will be hereinafter described in detail with reference to FIGS. 1 through 7B.

Figure 1:
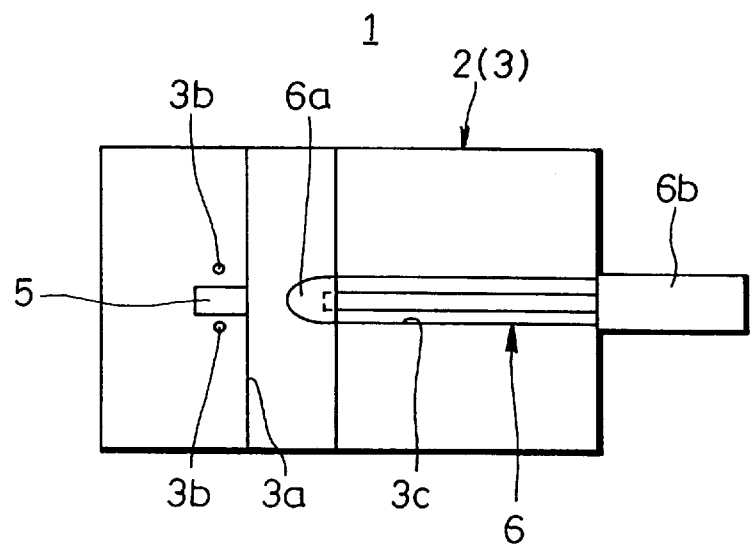
FIG. 1 is a plan view of a surface-mounted module according to the present invention.
Figure 2:
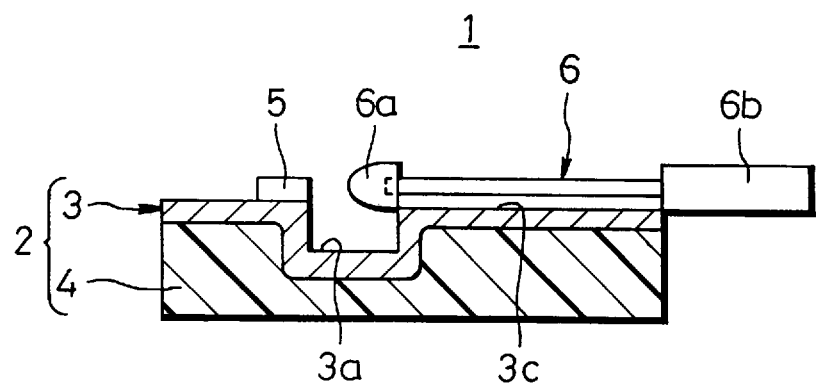
FIG. 2 is a sectional view of the module of FIG. 1.

As shown in FIGS. 1 and 2, a surface-mounted module 1 comprises a substrate 2, on which are mounted an LD 5 and an optical fiber 6 with their optical axes aligned with each other.

Figure 3A:
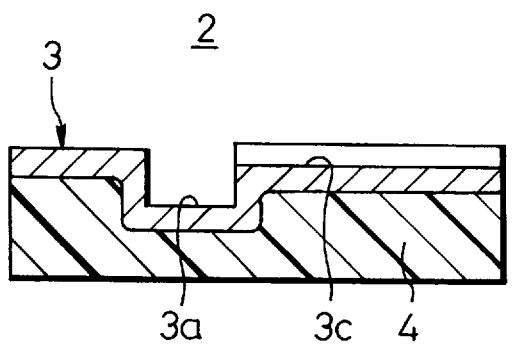
FIG. 3A is a sectional view of a substrate constituting the module of FIG. 1.
Figure 3B:
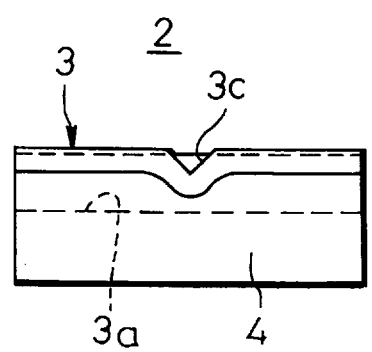
FIG. 3B is a right side view of the same.

The substrate 2 includes a base component 3 and a molded body 4. The base component 3 has a transverse groove 3a formed in a width direction thereof, and one of the two raised parts on the opposite sides of the transverse groove 3a is slightly lower in level than the other. Marks 3b indicative of the mounting position for the LD 5 are formed on the one raised part, and a V-groove 3c is formed in the other raised part. The molded body 4 is made by subjecting a heat conductive material, for example, a synthetic resin containing a metal filler or a ceramic-based adhesive containing a metal filler, to molding, or by subjecting a metal to injection molding or the like. As shown in FIGS. 3A and 3B, the molded body 4 and the base component 3 are integrally joined together to form a one-piece member.

Figure 4:
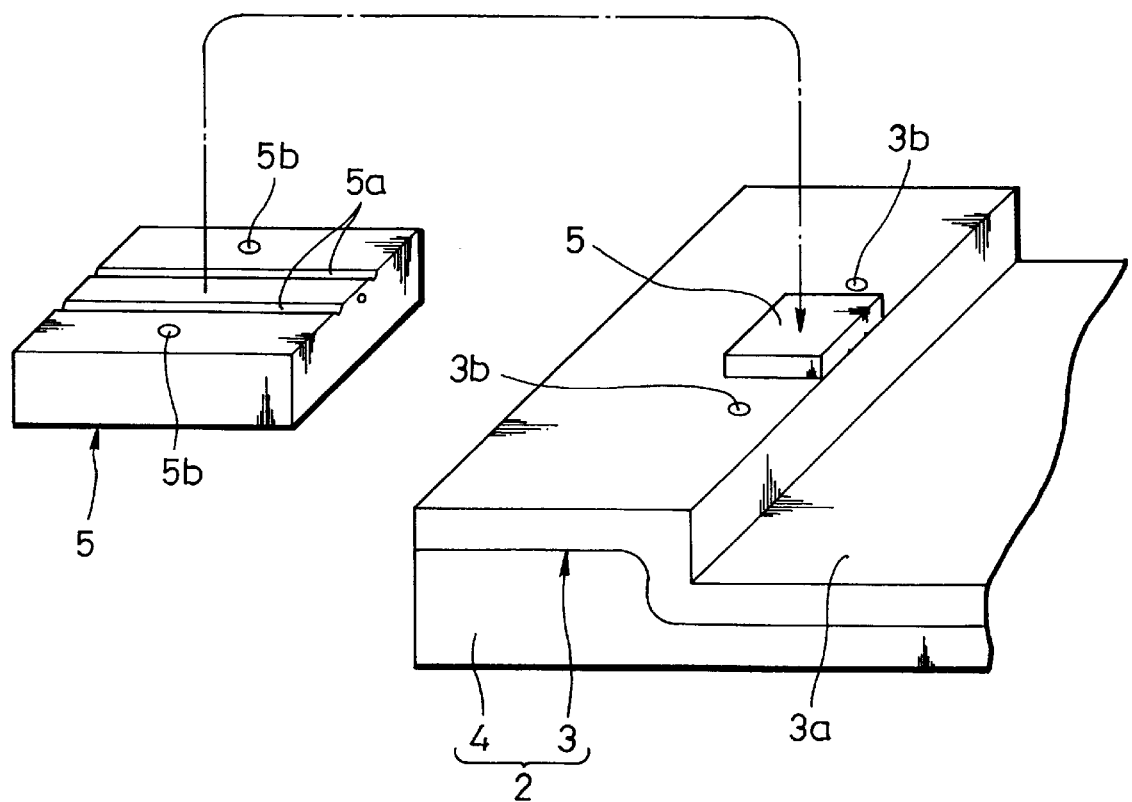
FIG. 4 is a perspective view showing a state in which an LD is fixed on the substrate of the surface-mounted module shown in FIG. 1.

Two trenches 5a are formed in a mounting surface of the LD 5 in order to improve the laser oscillation characteristics, and marks 5b (see FIG. 4) are provided at locations more outward than the respective trenches 5a with high precision relative to the active layer. As shown in FIG. 1, the LD 5 is mounted in position such that the LD and the V-groove 3c are located on the opposite sides of the transverse groove 3a. In order to show the details of the LD 5, the LD on the left-hand side of FIG. 4 is enlarged relative to the substrate 2 on the right-hand side.

The optical fiber 6 is mounted on the base component 3 with its position restricted by the V-groove 3c, and has a large-diameter lensed fiber section 6a attached to one end thereof and a ferrule 6b attached to the other. The lensed fiber section 6a includes no core and has an isotropic refractive index, and its distal end face is convexly curved. The ferrule 6b is a single-fiber ferrule for connecting the optical fiber 6 to another optical fiber.

The surface-mounted module 1 having the above-described arrangement is produced in the following manner.

Figure 6:
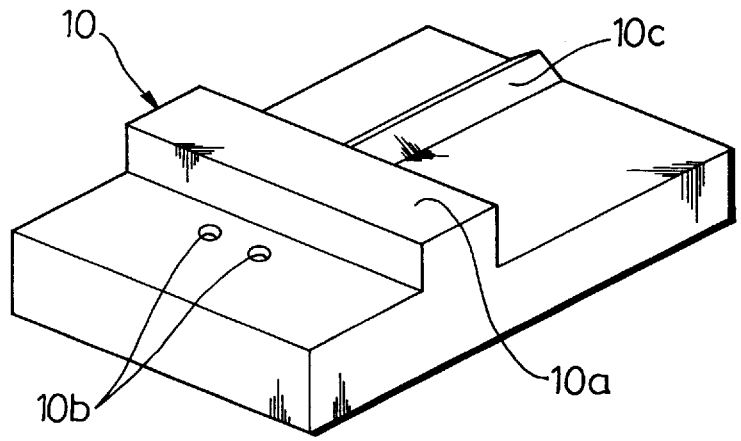
FIG. 6 is a perspective view of a master component used in producing the surface-mounted module of FIG. 1.

First, to obtain the base component 3, a master component 10 shown in FIG. 6 is prepared. The master component 10 has surface unevenness or contours formed with precision so as to be in exactly converse relation to the counterpart of the base component 3 having the transverse groove 3a, the marks 3b and the V-groove 3c, and has a rectangular ridge 10a corresponding to the transverse groove 3a, recesses 10b corresponding to the respective marks 3b, and a ridge 10c corresponding to the V-groove 3c. As the material of the master component 10, an electrically nonconductive material such as silicon or an electrically conductive material such as Ni or Cu can be used.

Subsequently, in the case where the master component 10 is made of an electrically nonconductive material, the surface of the master component is given electrical conductivity by being flashed with nickel, copper or the like. On the other hand, where the master component 10 is made of an electrically conductive material, such process for imparting electrical conductivity to the surface of the master component is unnecessary.

Figure 7A:
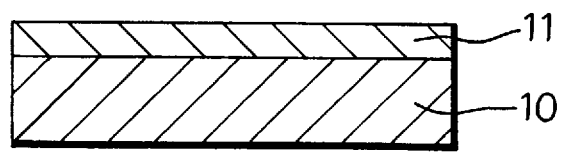
FIGS. 7A and 7B are process diagrams illustrating how a base component is produced using the master component of FIG. 6.

Then, using the master component 10 as the cathode, a thick electroplate layer 11 of nickel, copper or the like is formed on the surface of the master component 10 by electroforming, as shown in FIG. 7A. In this case, by arranging a large number of master components 10 side by side, it is possible to obtain as, many base components 3 at a time.

The electroforming process may possibly take several days; however, the electroforming is advantageous in that the contours or surface unevenness of the master component 10 can be duplicated with high accuracy on the submicron order and that the cost of electroforming equipment and of the electroforming process is low.

Figure 7B:
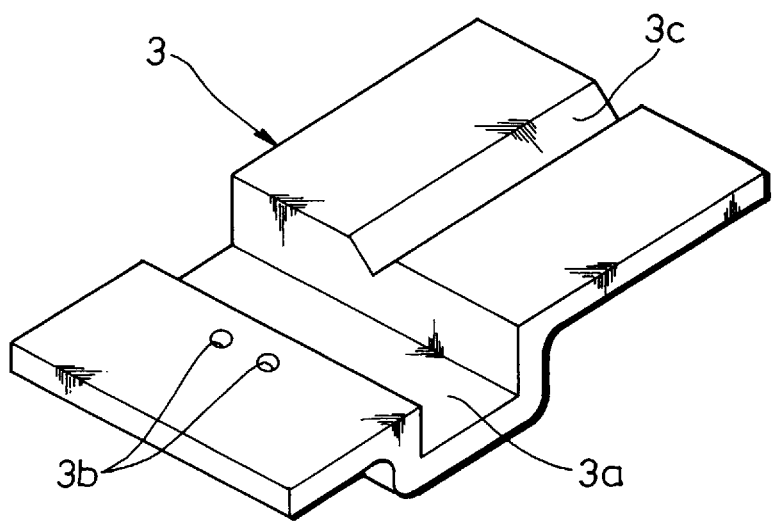

Subsequently, the electroplate layer 11 is peeled off from the master component 10, thereby obtaining a base component 3 having a transverse groove 3a, marks 3b and a V-groove 3c, as shown in FIG. 7B.

The base component 3 obtained in this manner is then set in a mold, and a molded body 4 is formed by insert molding using a heat conductive material, such as a synthetic resin or ceramic-based adhesive containing a metal filler, etc., whereby a substrate 2 is obtained.

Then, as shown in FIG. 4, the LD 5 is turned over and placed between the marks 3b, 3b formed on the substrate 2. Near infrared rays are then radiated from above the substrate 2, and by using a vidicon camera equipped with a microscope, the marks 5b and their corresponding marks 3b are observed through the medium of near infrared rays transmitting through the LD 5 so that the LD 5 may be positioned relative to the base component 3 with an accuracy of approximately 1 μm or less by means of an image recognition technique etc.

While in this state, the LD 5 and the base component 3 thus positioned relative to each other are bonded together by a eutectic alloy such as a gold-tin alloy, thereby fixing the LD 5 on the substrate 2.

Subsequently, the optical fiber 6 is positioned in the V-groove 3c of the base component 3 and fixed thereto by an adhesive etc., whereby the surface-mounted module 1 is fabricated. At this time, the lensed fiber section 6a is located in the transverse groove 3a, so that the optical fiber 6 is positioned in the direction of the V-groove 3c.

Figure 5:
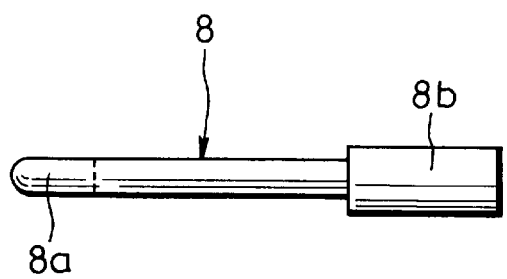
FIG. 5 is a front view showing a modification of an optical fiber used with the surface-mounted module of FIG. 1.

The optical fiber to be used may alternatively be the one shown in FIG. 5, wherein an optical fiber 8 has a lensed fiber section 8a with an identical diameter attached to one end thereof and has a ferrule 8b attached to the other end thereof. In the case of using this optical fiber 8, the distal end of the lensed fiber section 8a is positioned with accuracy relative to the LD 5 by utilizing an image recognition technique etc. while being observed through a microscope, and then the optical fiber 8 is fixed in the V-groove 3c.

In the above embodiment, the base component 3 is produced by using the master component 10. Alternatively, using a matrix made in advance of silicon or the like, the base component 3 can be produced with high accuracy following two steps of duplication by the precision transfer process mentioned above.

Using silicon or the like, the matrix can be produced with high accuracy by photolithography in exactly the same shape as the base component 3. Then, using as a master component matrix the thus-obtained article with the same shape as the base component 3, master components are produced by a precision transfer process such as electroforming or sputtering. By employing this process, a single matrix has only to be produced with high accuracy under strict control, and any desired number of master components can be produced with high accuracy using the matrix. In the case where sputtering is employed, electrically nonconductive materials such as silicon can also be used, so that materials that ensure high dimensional accuracy can be selected and used.

Also, the base component 3 can be produced with high accuracy and at low cost by electroforming. Further, since the base component 3 of the surface-mounted module 1 is made of a metal while the molded body 4 is made of a heat conductive material, such as a synthetic resin or ceramic-based adhesive containing a metal filler, the substrate 2 has excellent heat dissipation property and the light output of the LD 5 mounted thereon can be increased.

Industrial Applicability

With the surface-mounted module and the method of producing the same according to the present invention, the base component having marks indicative of the mounting position for an optical semiconductor device, such as a semiconductor laser, and an optical fiber positioning section is produced by a precision transfer process using a master component; therefore, the surface-mounted module can be fabricated with high accuracy and at low cost, and the light output of the mounted semiconductor laser can be increased.

An optical fiber used in this case is such that a lensed fiber section, which includes no core and has an isotropic refractive index and an end face of which is convexly curved, is attached to one end of the optical fiber. Accordingly, the distance between the optical fiber and the optical semiconductor device can be set to 100 μm or more, and the allowable positioning error of the optical axis of the optical fiber in the transverse direction perpendicular to the optical axis of the optical semiconductor device may be 1 μm or more, thus facilitating the positioning of component parts without greatly affecting the coupling efficiency.

I claim:

1. A surface-mounted module comprising:
    an optical semiconductor device; and
    an optical fiber mounted on a substrate,
    wherein the substrate comprises a base component and a molded body joined integrally to said base component, and
    wherein said base component has a mark indicative of a mounting position for the optical semiconductor device and a positioning section for positioning the optical fiber, and is formed by a precision transfer process.

2. The surface-mounted module according to claim 1, wherein said positioning section comprises a V-groove.

3. The surface-mounted module according to claim 2, wherein said molded body is made of a heat conductive material.

4. The surface-mounted module according to claim 3, wherein said heat conductive material comprises one of a resin containing a metal filler and an injection-molded metal member.

5. The surface-mounted module according to claim 2, further comprising a core-less lensed fiber section attached to one end of said optical fiber, the lensed fiber section having an isotropic refractive index and having one end face convexly curved.

6. The surface-mounted module according to claim 2, wherein said optical semiconductor device and said optical fiber are arranged on opposite sides of a transverse groove so as to face each other.

7. The surface-mounted module according to claim 1, wherein said molded body is made of a heat conductive material.

8. The surface-mounted module according to claim 7, further comprising a core-less lensed fiber section attached to one end of said optical fiber, the lensed fiber section having an isotropic refractive index and having one end face convexly curved.

9. The surface-mounted module according to claim 7, wherein said optical semiconductor device and said optical fiber are arranged on opposite sides of a transverse groove so as to face each other.

10. The surface-mounted module according to claim 7, wherein said heat conductive material comprises one of a resin containing a metal filler and an injection-molded metal member.

11. The surface-mounted module according to claim 1, further comprising a core-less lensed fiber section attached to one end of said optical fiber, the lensed fiber section having an isotropic refractive index and having one end face convexly curved.

12. The surface-mounted module according to claim 11, wherein said optical semiconductor device and said optical fiber are arranged on opposite sides of a transverse groove so as to face each other.

13. The surface-mounted module according to claim 1, wherein said optical semiconductor device and said optical fiber are arranged on opposite sides of a transverse groove so as to face each other.

14. A method of producing the surface-mounted module of claim 1, comprising:

forming the base component by a precision transfer process using a master component having a surface unevenness which is converse to the mark indicative of the mounting position for the optical semiconductor device and the positioning section for positioning the optical fiber;

backing the base component with the molded body so as to form the substrate; and positioning the optical semiconductor device and the optical fiber by means of the mark and the positioning section, respectively, to thereby mount the optical semiconductor device and the optical fiber on the substrate.

15. The method according to claim 14, wherein said precision transfer process comprises one of electroforming and sputtering.

* * * * *